Jan. 13, 1953      J. H. EAGLE      2,625,359

MIRROR MOUNT

Filed Nov. 19 1947

John H. Eagle
INVENTOR

BY *Newton M. Perrins*
*J. Griffin Little*
ATTORNEYS

Patented Jan. 13, 1953

2,625,359

UNITED STATES PATENT OFFICE 2,625,359

MIRROR MOUNT

John H. Eagle, Rochester, N. Y., assignor to Eastman Kodak Company, Rochester, N. Y., a corporation of New Jersey Application November 19, 1947, Serial No. 786,943

5 Claims. (Cl. 248—316)

The present invention relates to optical instruments, and more particularly to a mirror holder or mount therefor.

It is common practice in optical instruments to employ mirrors which are positioned to reflect a beam of light to a specific position. In use, the mirrors may become dirty, cracked or broken, and may require removal for cleaning and/or replacement. In addition, the mirror may be subjected to temperature changes which will cause expansion or contraction of the mirror. If such a mirror is held rigidly in place, it may tend to crack or break due to temperature changes. Such rigid holding of the mirror may also tend to distort the optical image formed by the mirror.

The present invention overcomes these difficulties by providing a resilient clip which will hold the mirror yieldably in place. This clip affords the desired resiliency to allow the mirror to expand and to contract without distorting the image, the advantages of which will be readily apparent to those in the art. While the clip securely retains the mirror in position, it permits the ready removal of the mirror for cleaning and/or replacement.

The present invention has, therefore, as its principal object a mirror holding means which yieldably but firmly retains the mirror in position.

A still further object of the invention is the provision of a holding means which permits easy and quick positioning of the mirror on its removal from its support.

A further object of the invention is the provision of a mirror retaining member which is designed to require the minimum of parts, is of rugged construction, and affords easy assembling.

Yet another object of the invention is the provision of a mirror retaining member which supports the mirror kinematically in such a way that very little mounting strain is present to distort the optical image formed by the mirror.

To these and other ends, the invention resides in certain improvements and combinations of parts, all as will be hereinafter more fully described, the novel features being pointed out in the claims at the end of the specification.

In the drawings.

Similar reference numerals throughout the various views indicate the same parts.

Figure 1:
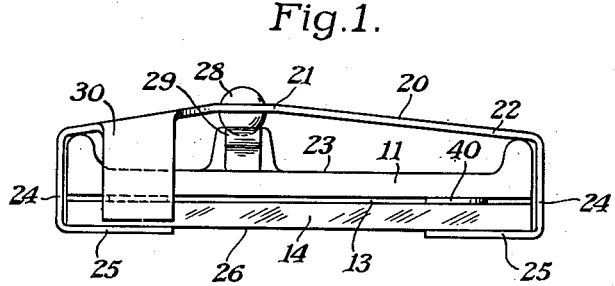
Fig. 1 is a plan view of a mirror, showing the relation thereto of the mount and retaining means constructed in accordance with the present invention.
Figure 2:
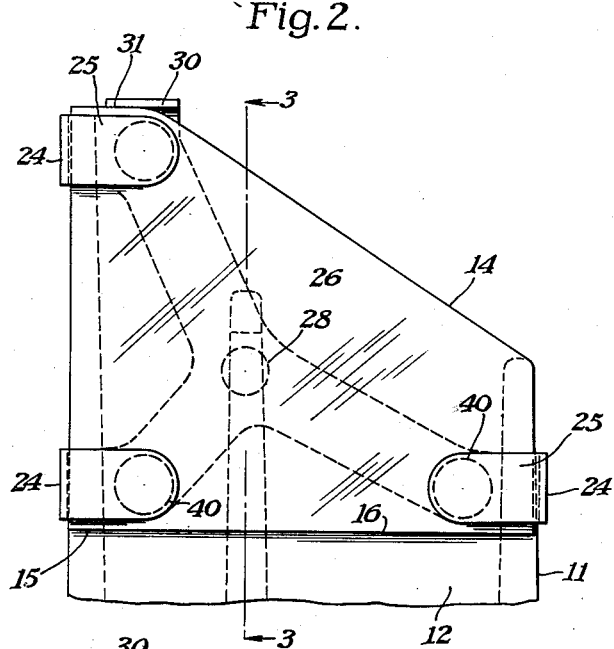
Fig. 2 is a front view of a portion of the supporting mount, showing the relation thereto of the spring clip retaining member, and a mirror held in place thereby.

The drawings show a mount 11, the front face 12 of which is recessed, as shown at 13, to receive a plane mirror 14 of the shape best shown in Fig. 2. The shape of the mirror is merely illustrative of one form which may be used, as it is apparent that the mirror may be otherwise shaped to suit the purpose for which it is to be used. Also, the mount may be made of any desired shape or material and is not to be limited to the precise shape shown. The lower end of recess 13 terminates in a shoulder 15 which is adapted to engage the lower edge 16 of the mirror 14 to support the latter, as clearly illustrated in Fig. 3. In the latter figure, the mirror is shown positioned in vertical relation, but it is understood and contemplated that the mount or the face 12 or both may be disposed so as to position the mirror in an inclined or horizontal position, if desired.

Figure 3:
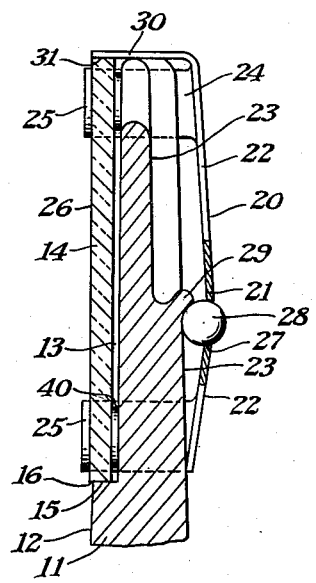
Fig. 3 is a vertical sectional view taken substantially on line 3—3 of Fig. 2, showing the relation of the mirror, mount, and the spring clip.
Figure 4:
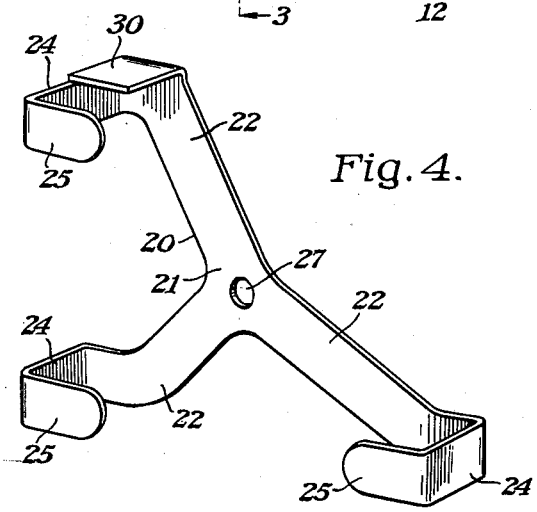
Fig. 4 is a perspective view of the spring clip retaining member, showing the relation of the various parts.

A spring clip, generally indicated by the numeral 20, of the shape best shown in Figs. 2 and 4, serves to yieldably hold the mirror 14 in alignment with the face 12 and on the shoulder 15, as shown in Fig. 3. This spring clip comprises a central portion 21 from which radiates, in a Y-relation, three arms 22 which extend across the back of the mount 11 and are spaced from the rear surface 23 thereof, as shown in Fig. 3. The positions, lengths and shapes of the arms 22 will depend, of course, on the particular size, shape and arrangement of the mirror 14, and the form shown is merely illustrative and not to be taken as a limitation except as is necessitated by the claims. The three ends of the arms 22 are bent forwardly, as shown at 24, to be bent over the side edges of the mount and the mirror, and then bent inwardly towards each other to provide three spaced pads or fingers 25 which engage the front face 26 of the mirror 14 at spaced points which, obviously, are outside the area occupied by the image.

Thus, the mirror 14 is engaged at three spaced points by the spring clip, as is apparent from an inspection of Fig. 2. In order that the spring clip may be effective in retaining the mirror in engagement with the face 12 and on the shoulder 15, the clip is preferably tensioned so that the pads 25 yieldably engage the face 26 to releasably retain the mirror in position. To secure this result, the central portion 21 of the clip is formed with an aperture 27 adapted to receive a ball 28 which is positioned between the portion 21 and the rear surface 23 of the mount to bow the arms 22 rearwardly, as shown in Fig. 3, to tension the clip. The mirror thus positioned is held yieldably in place by the tensioned clip which may be assembled merely by slipping it down over the mirror and mount assembly, the ball providing a spring action for the clip to hold the entire assembly together. In order to prevent the ball 28 from becoming dislodged, the rear surface 23 of the mount is formed with a rearwardly and upwardly projecting ear 29 under which the ball is positioned, as best shown in Fig. 3. This ball and ear arrangement serves to retain the ball and clip in place, yet permits the clip to be easily disconnected, when desired.

In order to insure the retention of the lower edge of the mirror 16 on the shoulder 15, the end of the upper arm 22 is formed with a forwardly extending lug or plate 30 which passes over the top of the mount, see Fig. 3, and engages the upper surface 31 of the mirror 14 so that the latter is held against vertical movement between the shoulder 15 and the plate 30. Small spacers 40 of cork, paper or other suitable material may be positioned behind the mirror 14 opposite the pads or fingers 25 to prove an even bearing surface.

The present invention thus provides an arrangement for yieldably retaining a mirror in position on a mount. The holding means causes very little mounting strain so that it will not distort the image formed by the mirror, and will also allow the latter to alter its dimensions due to temperature changes without damage to the mirror. In addition, the mounting support is simple in design, can be assembled easily and quickly, and may be readily removed when desired.

While one embodiment of the invention has been disclosed, it is to be understood that the inventive idea may be carried out in a number of ways. This application is, therefore, not to be limited to the precise details disclosed but is intended to cover all variations or modifications falling within the scope of the appended claims.

I claim:

1. A mirror holder comprising, in combination, a mount, a shoulder formed on said mount and against which a mirror may rest to support the latter, a one-piece flexible spring clip formed with integral projecting arms, a pad carried by each of said arms and adapted to engage a surface of said mirror to retain the latter in place on said mount, means on one of said arms for engaging said mirror to retain the latter positively in supporting relation with said shoulder, and means for flexing said clip for tensioning the entire clip to retain the latter in supporting relation with said shoulder, and to maintain said pads in yieldable holding relation with said mirror.

2. A mirror holder comprising, in combination, a mount, a shoulder formed on said mount and against which a mirror may rest to support the latter, a spring clip formed with projecting arms, a pad carried by each of said arms and adapted to engage a surface of said mirror to retain the latter in place on said mount, said clip being formed with an opening, and a ball recessed in said opening and engaging said mount to tension said clip to hold said pads in yieldable holding relation with said mirror.

3. A mirror holder comprising, in combination, a mount, a shoulder formed on said mount and against which a mirror may rest to support the latter, a spring clip formed with projecting arms, a pad carried by each of said arms and adapted to engage a surface of said mirror to retain the latter in place on said mount, said clip being formed with an opening, a ball recessed in said opening and engaging said mount to tension said clip to hold said pads in yieldable holding relation with said mirror, and means carried by one of said arms for engaging said mirror to hold the latter against said shoulder.

4. A mirror holder comprising, in combination, a mount, a shoulder formed on said mount and against which a mirror may rest to support the latter, a spring clip formed with projecting arms, a pad carried by each of said arms and adapted to engage a surface of said mirror to retain the latter in place on said mount, said clip being formed with an opening, a ball recessed in said opening and engaging said mount to tension said clip to hold said pads in yieldable holding relation with said mirror, and an ear formed on said mount and engaging said ball to retain the clip in position on said mount.

5. A mirror holder comprising, in combination, a mount the front surface of which is recessed to receive a mirror, a shoulder at the bottom of said recess for supporting said mirror, a Y-shaped clip positioned behind said mount and formed with spaced pads to extend around the edge of said mirror and engage the front face thereof to hold said mirror against the mount, said clip being formed with an opening, a ball recessed in said opening and engaging the back of said mount to bow the clip to tension the latter to retain said pads in resilient engagement with said face, and an ear formed on said back and engaging said ball to retain the latter and clip in assembled relation on said mount.

JOHN H. EAGLE.

REFERENCES CITED

The following references are of record in the file of this patent:

UNITED STATES PATENTS

| Number | Name | Date |
| --- | --- | --- |
| 628,714 | Ingersoll | July 11, 1899 |
| 1,210,934 | Hayes | Jan. 2, 1917 |
| 1,315,326 | Palis | Sept. 9, 1919 |
| 1,425,550 | Spiro | Aug. 15, 1922 |
| 1,701,419 | Peden | Feb. 5, 1929 |
| 1,853,483 | Winters | Apr. 12, 1932 |
| 1,936,100 | Stack | Nov. 21, 1933 |
| 2,455,919 | Daon | Dec. 14, 1948 |

FOREIGN PATENTS

| Number | Country | Date |
| --- | --- | --- |
| 442,888 | France | of 1913 |